(12) United States Patent
Puzio

(10) Patent No.: US 7,645,101 B2
(45) Date of Patent: *Jan. 12, 2010

(54) CHUCK WITH INTERNALLY THREADED JAW IN A PTO APPLICATION

(75) Inventor: Daniel Puzio, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 18 days.

This patent is subject to a terminal disclaimer.

(21) Appl. No.: 11/687,050

(22) Filed: Mar. 16, 2007

(65) Prior Publication Data

US 2007/0158086 A1 Jul. 12, 2007

Related U.S. Application Data

(63) Continuation-in-part of application No. 11/400,378, filed on Apr. 10, 2006, and a continuation-in-part of application No. 11/227,200, filed on Sep. 16, 2005.

(60) Provisional application No. 60/787,161, filed on Mar. 30, 2006.

(51) Int. Cl.
*B23B 31/163* (2006.01)
(52) U.S. Cl. .................... 408/124; 408/139; 279/62; 279/902
(58) Field of Classification Search ............ 279/60–65, 279/134, 135, 902; 408/124, 139; *B23B 31/163*
See application file for complete search history.

(56) References Cited

U.S. PATENT DOCUMENTS

| 913,059 | A | | 2/1909 | Savage |
| 1,705,275 | A | * | 3/1929 | Von Neudeck ............... 279/64 |
| 2,353,514 | A | | 7/1944 | Slater |
| 2,684,856 | A | | 7/1954 | Stoner |
| 2,716,555 | A | | 8/1955 | Rowe Walker |
| 2,848,911 | A | | 8/1958 | Black |
| 2,931,660 | A | | 4/1960 | Barwinkel |
| 2,963,913 | A | * | 12/1960 | Wensloff ..................... 74/15.6 |
| 3,021,723 | A | * | 2/1962 | Happe ......................... 74/527 |
| 3,506,277 | A | * | 4/1970 | Harms ......................... 279/63 |
| 3,545,766 | A | | 12/1970 | Osborn |

(Continued)

FOREIGN PATENT DOCUMENTS

DE 1985830 5/1968

(Continued)

*Primary Examiner*—Eric A Gates
(74) *Attorney, Agent, or Firm*—Capitol City TechLaw

(57) ABSTRACT

A power driver may include a housing, a tool chuck and a power take off mechanism. The tool chuck may have an input shaft mounted for rotation on the housing. The input shaft may support threaded chuck jaws. A chuck actuating shaft may be mounted for rotation on the input shaft. The chuck actuating shaft may be screw coupled to the threaded chuck jaws. The power take off mechanism may be connected to the tool chuck. The power take off mechanism may be adjustable into a DRILL DRIVE MODE to rotationally drive the input shaft and the chuck actuating shaft together as a unit, and a CHUCK MODE to rotationally drive the chuck actuating shaft relative to the input shaft. The power take off mechanism may be internal of the housing. The power take off mechanism in the CHUCK MODE may rotationally fix the input shaft to the housing.

18 Claims, 3 Drawing Sheets

U.S. PATENT DOCUMENTS

| | | | |
|---|---|---|---|
| 3,776,647 A | 12/1973 | Hart | |
| 3,970,323 A | 7/1976 | Schnizler, Jr. | |
| 4,085,337 A * | 4/1978 | Moeller | 307/115 |
| 4,094,523 A | 6/1978 | Derbyshire | |
| 4,260,169 A | 4/1981 | Hall | |
| 4,277,074 A | 7/1981 | Kilberis | |
| 4,302,021 A | 11/1981 | Röhm | |
| 4,317,578 A | 3/1982 | Welch | |
| 4,323,324 A | 4/1982 | Eberhardt | |
| 4,358,230 A | 11/1982 | Rohlin | |
| 4,395,170 A | 7/1983 | Clarey | |
| 4,493,407 A | 1/1985 | Newton | |
| 4,498,682 A | 2/1985 | Glore | |
| 4,526,497 A | 7/1985 | Hatfield | |
| 4,527,809 A | 7/1985 | Umbert | |
| 4,536,113 A | 8/1985 | Hatfield | |
| 4,557,703 A | 12/1985 | Rivin | |
| 4,605,345 A | 8/1986 | Giughese | |
| 4,628,918 A | 12/1986 | Johnson, Jr. | |
| 4,655,464 A | 4/1987 | Manschitz et al. | |
| 4,664,394 A | 5/1987 | Theissig et al. | |
| 4,669,930 A | 6/1987 | Stenmark | |
| 4,669,932 A | 6/1987 | Hartley | |
| 4,682,918 A | 7/1987 | Palm | |
| 4,788,021 A | 11/1988 | Griffiths | |
| 4,802,798 A | 2/1989 | Adamson | |
| 4,824,298 A | 4/1989 | Lippacher et al. | |
| 4,840,387 A | 6/1989 | McCarthy | |
| 4,848,779 A | 7/1989 | Wheeler et al. | |
| 4,930,793 A | 6/1990 | Ando | |
| 4,951,955 A | 8/1990 | Sakamaki | |
| 4,955,623 A | 9/1990 | Röhm | |
| 4,958,840 A | 9/1990 | Palm | |
| 4,976,575 A | 12/1990 | Kappelhof et al. | |
| 4,998,589 A | 3/1991 | Wiesendanger | |
| 5,011,343 A | 4/1991 | Saban et al. | |
| 5,019,023 A | 5/1991 | Kurosawa | |
| 5,022,278 A | 6/1991 | Decaussin | |
| 5,031,925 A | 7/1991 | Tatsu et al. | |
| 5,067,376 A | 11/1991 | Fossella | |
| 5,090,273 A | 2/1992 | Fossella | |
| 5,125,673 A | 6/1992 | Huff et al. | |
| 5,145,193 A | 9/1992 | Röhm | |
| 5,147,164 A | 9/1992 | Fraver | |
| 5,171,030 A | 12/1992 | Röhm | |
| 5,172,923 A | 12/1992 | Nakamura | |
| 5,174,588 A | 12/1992 | Reibetanz et al. | |
| 5,183,274 A | 2/1993 | Sakamaki | |
| 5,195,760 A * | 3/1993 | Wheeler et al. | 279/60 |
| 5,197,749 A | 3/1993 | Moore et al. | |
| 5,215,317 A | 6/1993 | Jordan et al. | |
| 5,232,230 A | 8/1993 | Lin | |
| 5,286,041 A | 2/1994 | Röhm | |
| 5,299,814 A | 4/1994 | Salpaka | |
| 5,322,303 A | 6/1994 | Nakamura | |
| 5,339,908 A | 8/1994 | Yokota et al. | |
| 5,340,248 A | 8/1994 | Enbergs | |
| 5,342,154 A | 8/1994 | Holzer | |
| 5,343,961 A | 9/1994 | Ichikawa | |
| 5,348,317 A | 9/1994 | Steadings et al. | |
| 5,348,318 A | 9/1994 | Steadings et al. | |
| 5,407,215 A | 4/1995 | Yang | |
| 5,419,663 A | 5/1995 | Psomas | |
| 5,431,420 A | 7/1995 | Huff et al. | |
| 5,435,578 A | 7/1995 | Röhm | |
| 5,448,931 A | 9/1995 | Fossella et al. | |
| 5,458,345 A | 10/1995 | Amyot | |
| 5,499,829 A | 3/1996 | Röhm | |
| 5,499,830 A | 3/1996 | Schnizler | |
| 5,531,549 A | 7/1996 | Fossella | |
| 5,553,873 A | 9/1996 | Salpaka et al. | |
| 5,573,358 A | 11/1996 | Gobbers et al. | |
| 5,624,125 A | 4/1997 | Röhm | |
| 5,685,549 A | 11/1997 | Yang | |
| 5,732,956 A | 3/1998 | Huff et al. | |
| 5,741,016 A | 4/1998 | Barton et al. | |
| 5,795,110 A | 8/1998 | Wirth et al. | |
| 5,820,134 A | 10/1998 | Subils Valls | |
| 5,908,076 A | 6/1999 | Marcengill et al. | |
| 5,918,685 A | 7/1999 | Ulbrich et al. | |
| 5,922,538 A | 7/1999 | Hazel et al. | |
| 5,951,026 A | 9/1999 | Harman, Jr. et al. | |
| 5,957,469 A | 9/1999 | Miles et al. | |
| 5,988,653 A | 11/1999 | Kuo | |
| 5,988,958 A | 11/1999 | Mack | |
| 5,992,859 A | 11/1999 | Lin | |
| 6,007,071 A | 12/1999 | Middleton | |
| 6,007,277 A | 12/1999 | Olson et al. | |
| 6,017,039 A | 1/2000 | Gaddis et al. | |
| 6,056,298 A | 5/2000 | Williams | |
| 6,079,716 A | 6/2000 | Harman, Jr. et al. | |
| 6,105,450 A | 8/2000 | Sasaki et al. | |
| 6,139,228 A | 10/2000 | Longo | |
| 6,173,972 B1 | 1/2001 | Temple-Wilson et al. | |
| 6,260,856 B1 | 7/2001 | Temple-Wilson | |
| 6,354,605 B1 | 3/2002 | Aultman | |
| 6,398,226 B1 | 6/2002 | Huggins et al. | |
| 6,431,289 B1 | 8/2002 | Potter | |
| 6,488,286 B2 | 12/2002 | Yaksich | |
| 6,488,287 B2 | 12/2002 | Gaddis et al. | |
| 6,506,002 B1 | 1/2003 | Cummins | |
| 6,517,295 B2 | 2/2003 | Lin | |
| 6,523,658 B2 | 2/2003 | Furuta et al. | |
| 6,648,563 B2 | 11/2003 | Rohm | |
| 6,729,812 B2 | 5/2004 | Yaksich et al. | |
| 6,733,393 B2 | 5/2004 | Rivin | |
| 6,736,410 B2 | 5/2004 | Barton et al. | |
| 6,832,764 B2 | 12/2004 | Steadings et al. | |
| 6,843,484 B2 * | 1/2005 | Schroeder | 279/60 |
| 7,021,400 B2 | 4/2006 | Oretti | |
| 7,073,606 B2 | 7/2006 | Mamber et al. | |
| 7,328,904 B2 * | 2/2008 | Schell et al. | 279/60 |
| 2001/0026051 A1 | 10/2001 | Gifford et al. | |
| 2003/0077137 A1 | 4/2003 | Rohm | |
| 2004/0146367 A1 | 7/2004 | Gerhardt et al. | |
| 2005/0013674 A1 | 1/2005 | Vidal | |
| 2006/0027978 A1 | 2/2006 | Young et al. | |
| 2006/0066063 A1 | 3/2006 | Nickels et al. | |
| 2006/0188350 A1 * | 8/2006 | Gehret et al. | 408/240 |

FOREIGN PATENT DOCUMENTS

| | | |
|---|---|---|
| DE | 2317779 | 10/1974 |
| DE | 7536582 | 5/1976 |
| DE | 7617128 | 12/1976 |
| DE | 2757140 | 6/1979 |
| DE | 8002633 | 7/1980 |
| DE | 3110458 | 10/1982 |
| DE | 3140776 | 4/1983 |
| DE | 8513848 | 8/1985 |
| DE | 9006555 | 9/1990 |
| DE | 9405628 | 7/1994 |
| DE | 3527234 | 2/1997 |
| DE | 29820433 | 3/1999 |
| DE | 29913083 | 10/1999 |
| DE | 10125186 | 12/2002 |
| DE | 202004003323 | 8/2004 |
| DE | 10359420 | 7/2005 |
| EP | 0448801 | 10/1991 |
| EP | 0515371 | 12/1992 |
| EP | 0620069 | 10/1994 |
| EP | 0716896 | 1/1995 |
| EP | 0674961 | 10/1995 |
| EP | 1101553 | 5/2001 |

| | | | | | |
|---|---|---|---|---|---|
| FR | 1602481 | 1/1971 | WO | WO 2005/025792 | 3/2005 |
| WO | WO 00/35619 | 6/2000 | WO | WO 2006/034287 A2 | 3/2006 |
| WO | WO 02/058893 A1 | 8/2002 | | | |

* cited by examiner

US 7,645,101 B2

CHUCK WITH INTERNALLY THREADED JAW IN A PTO APPLICATION

CROSS REFERENCE TO RELATED APPLICATIONS

This US non-provisional application claims priority under 35 USC §119 to U.S. Provisional Application No. 60/787,161 filed Mar. 30, 2006, the content of which is incorporated herein in its entirety by reference. This US non-provisional application is a Continuation-In-Part of (1) U.S. application Ser. No. 11/227,200 filed Sep. 16, 2005 and (2) U.S. application Ser. No. 11/400,378 filed Apr. 10, 2006, the content of both of which is incorporated herein in its entirety by reference.

BACKGROUND

1. Field of the Invention

Example embodiments of the present invention relate in general to tool chucks for attachment of accessories to power drivers, and more particularly to a tool chuck having jaws that may be actuated via power from the driver's transmission.

2. Description of Related Art

A tool chuck may be provided on a power driver (e.g., a drill) for holding an accessory (e.g., a drill bit). The tool chuck may be actuated (to open and close the chuck jaws) via a power take off ("PTO") feature. Numerous and varied PTO features are described in commonly-assigned, copending application Ser. Nos. 11/227,200 filed Sep. 16, 2005, and 11/400,378 filed Apr. 10, 2006. In those copending applications, the tool chuck may utilize "pusher type" jaws, the structural and functional aspects of which are well known in this art.

SUMMARY

According to an example, non-limiting embodiment, a power driver may include a housing and a tool chuck. The tool chuck may have an input shaft mounted for rotation on the housing. The input shaft may support threaded chuck jaws. The tool chuck may also have chuck actuating shaft mounted for rotation on the input shaft. The chuck actuating shaft may be screw coupled to the threaded chuck jaws. A power take off mechanism may be connected to the tool chuck. The power take off mechanism may be adjustable into a DRILL DRIVE MODE to rotationally drive the input shaft and the chuck actuating shaft together as a unit, and a CHUCK MODE to rotationally drive the chuck actuating shaft relative to the input shaft. The power take off mechanism may be internal of the housing.

According to another example, non-limiting embodiment, a power driver may include a housing and a tool chuck. The tool chuck may have an input shaft mounted for rotation on the housing. The input shaft may support threaded chuck jaws. The tool chuck may also have a chuck actuating shaft mounted for rotation on the input shaft. The chuck actuating shaft may be screw coupled to the threaded chuck jaws. A power take off means may be provided for adjusting into a DRILL DRIVE MODE to rotationally drive the input shaft and the chuck actuating shaft together as a unit, and a CHUCK MODE to rotationally drive the chuck actuating shaft relative to the input shaft. The power take off means may be internal of the housing.

According to another example, non-limiting embodiment, a power driver may include a tool chuck. The tool chuck may have an input shaft support threaded chuck jaws, and a chuck actuating shaft mounted for rotation on the input shaft. A power take off mechanism may have a power take off actuator shaft rotationally fixed to the chuck actuating shaft. An output coupling may be rotationally fixed to the input shaft. A power take off drive disk may be rotationally fixed to the power take off actuator shaft. A disk may confront the power take off drive disk. A shift ring may be mounted for movement to selectively engage to the output coupling, the power take off drive disk and the disk.

Features of the invention including various and novel details of construction and combinations of parts will be more particularly described with reference to the accompanying drawings. It will be understood that the details of the example embodiments are shown by way of illustration only and not as limitations of the invention. The principles and features of this invention may be employed in varied and numerous embodiments without departing from the scope of the invention.

DESCRIPTION OF EXAMPLE, NON-LIMITING EMBODIMENTS

Figure 1:
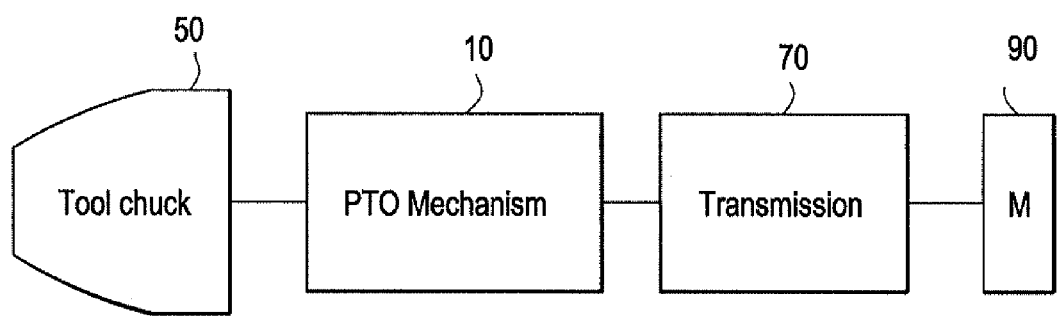
FIG. 1 is a schematic illustration of a tool chuck with a power take off mechanism according to an example, non-limiting embodiment.

FIG. 1 schematically shows an example, non-limiting embodiment of a tool chuck 50 that may be provided on a power driver (e.g., a drill) for holding an accessory (e.g., a drill bit). It will be appreciated, however, that the tool chuck 50 may be suitably implemented on a variety of power drivers (other than drills) for holding a variety of accessories (other than drill bits).

The tool chuck 50 may be connected to the transmission 70 of a power driver via a power take off ("PTO") mechanism 10. The transmission 70 may be coupled to an electric motor 90. The transmission 70 may use gearing to effect a change in the ratio between an input rpm (from the electric motor 90) and an output rpm (delivered to the tool chuck 50).

In this example embodiment, the transmission 70 may include three planetary reduction systems. It will be appreciated, however, that the invention is not limited in this regard. For example, more or less than three planetary reduction systems may be implemented. Further, transmissions other than planetary reduction system transmissions (e.g., conventional parallel axis transmissions) may be suitably implemented. Planetary reduction transmissions are well known in this art, and therefore a detailed discussion of the same is omitted. The PTO mechanism 10 may be provided at the output of the transmission 70.

A. The Structure

Figure 2:
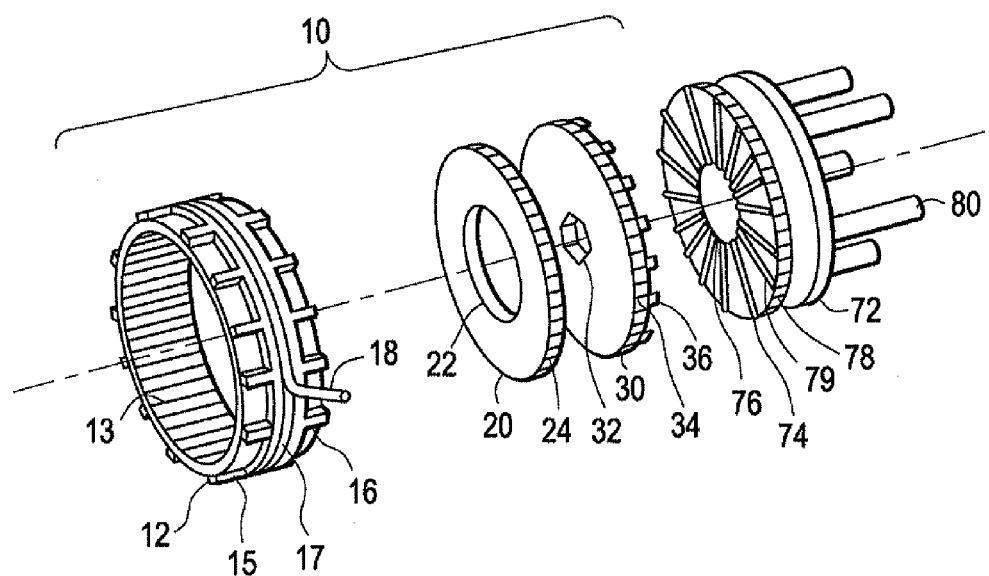
FIG. 2 is an exploded perspective view of the power take off mechanism of FIG. 1.

With reference to FIG. 2, the PTO mechanism 10 may include a shift ring 12, an output coupling 20 and a PTO drive disk 30.

The shift ring 12 may have a radial inward facing surface provided with splines 13 (for selectively engaging with the output coupling 20, the PTO drive disk 30 and a disk 74 of the third stage carrier 72). The shift ring 12 may have a radial outward facing surface provided with forwardly extended splines 15 and rearwardly extended splines 16 (for selective engaging with a housing of the driver, not shown) and a continuous circumferential groove 17 (for accommodating a wire 18).

The wire 18, which may be slidable through the circumferential groove 17, may have free ends that extend in a radial direction and out of the circumferential groove 17. The fee ends of the wire 18 (serving as cam followers) may be received in a slot of a shift collar (not shown in FIG. 2) rotatably mounted on the driver housing. Upon rotating the shift collar, the slot may influence the cam followers (and thus the shift ring 12) to the desired axial positions, as will be discussed in more detail below.

The output coupling 20 may include a central aperture 22 having a shape that corresponds to the shape of an input shaft 60 (not shown in FIG. 2), discussed in more detail below. The output coupling 20 may have a radial outward facing surface provided with splines 24 that selectively cooperate with the radial inward facing splines 13 of the shift ring 12.

The PTO drive disk 30 may include a central aperture 32 having a shape that corresponds to the shape of a PTO actuator shaft (not shown in FIG. 2), discussed in more detail below. The PTO drive disk 30 may have a radial outward facing surface provided with splines 34 that selectively cooperate with the radial inward facing splines 13 of the shift ring 12. The PTO drive disk 30 may have an axial rearward facing surface provided with clutch features 36. In this example embodiment, the clutch features 36 may be in the form of elongated projections that extend in a radial fashion across the axial rearward facing surface of the PTO drive disk 30.

The disk 74 of the third stage carrier 72 may include a central aperture 76 that extends axially through the third stage carrier 72. The disk 74 may have a radial outward facing surface provided with splines 78 that selectively cooperate with the radial inward facing splines 13 of the shift ring 12. The disk 74 may also include an axial forward facing surface provided with clutch features 79. In this example embodiment, the clutch features 79 may be in the form of elongated projections that extend in a radial fashion across the axial forward facing surface of the disk 74. The clutch features 79 of the disk 74 may cooperate with the clutch features 36 of the PTO drive disk 30. As is well known in this art, the third stage carrier 72 may include shafts 80 that rotatably support planetary gears (not shown).

Figure 3:
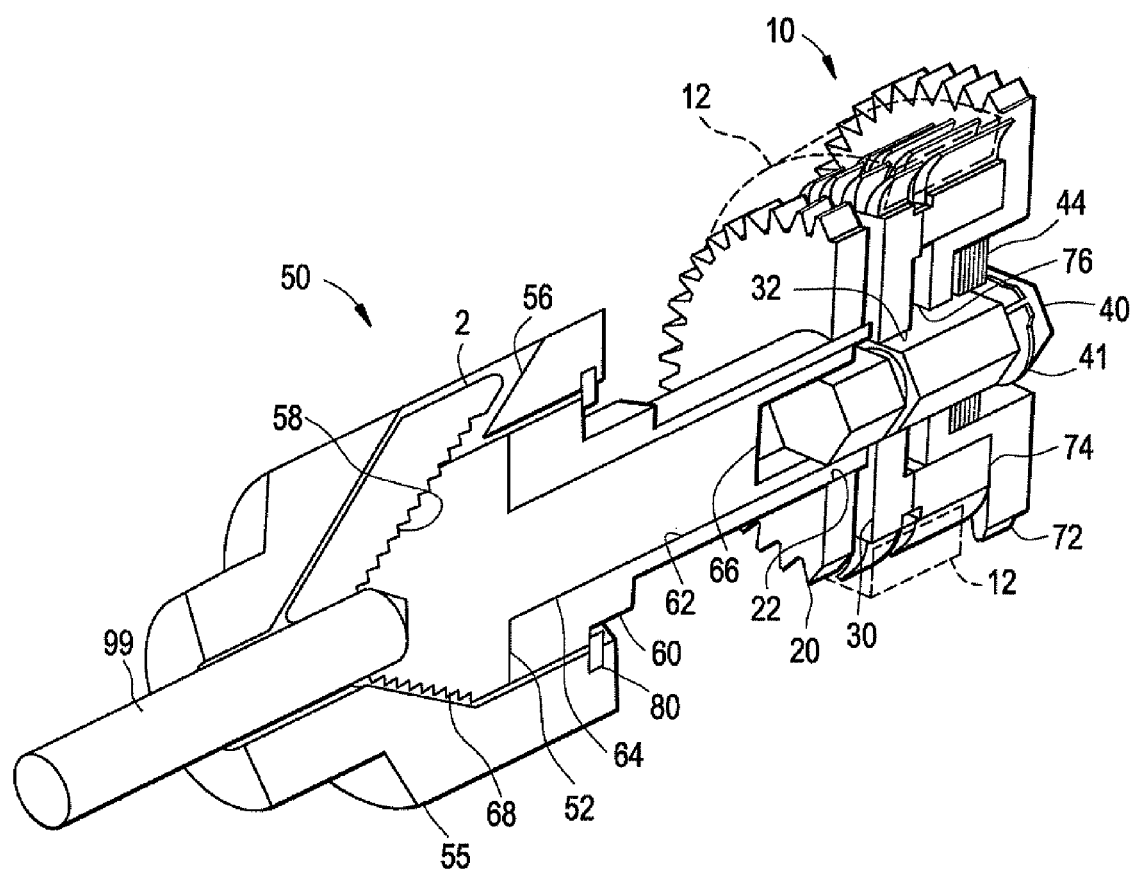
FIG. 3 is a sectional perspective view of the tool chuck mounted on the power take off mechanism of FIG. 1.

FIG. 3 is a sectional perspective view of the PTO mechanism 10 assembled together with the tool chuck 50. Here, the shift ring 12 is shown in phantom for clarity.

Figure 4:
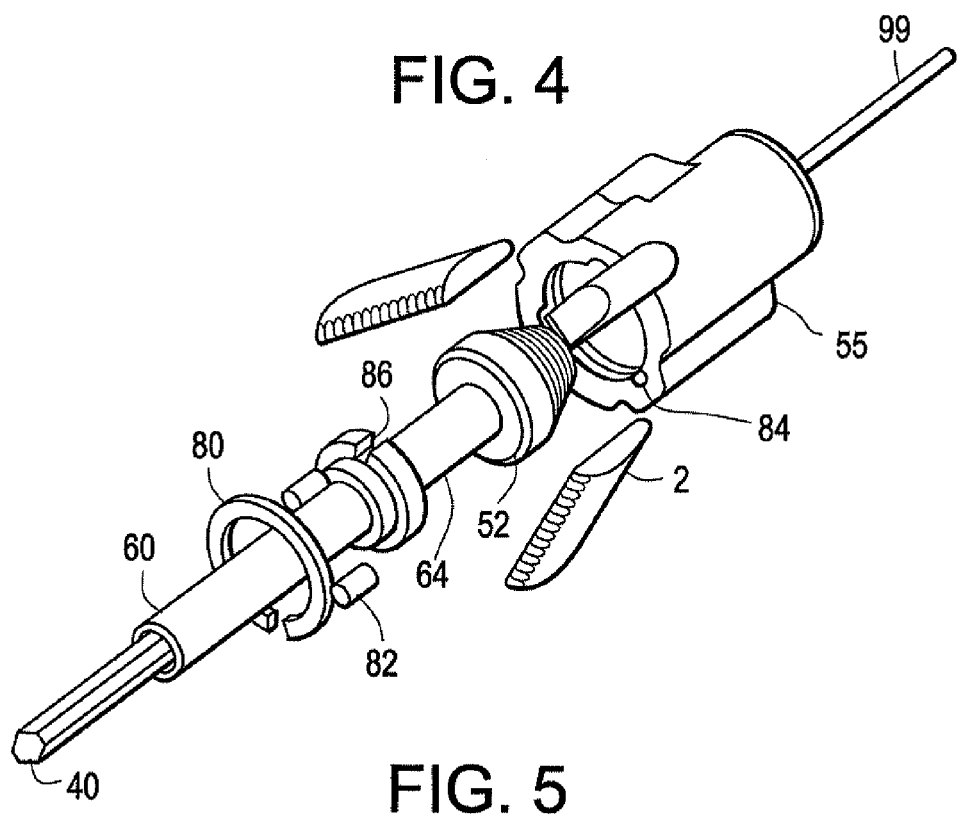
FIG. 4 is an exploded perspective view of some of the component parts of the tool chuck and the power take off mechanism of FIG. 1.

The tool chuck 50 may include an input shaft 60. A forward end of the input shaft 60 may support a jaw carrier 55. The jaw carrier 55 may include passageways 56 through which chuck jaws 2 are respectively slidable. The jaw carrier 55 and the input shaft 60 may be rotationally locked together. By way of example only, and turning briefly to FIG. 4, the input shaft 60 may include radial outward facing divots 86, and the jaw carrier 55 may include corresponding radial inward facing divots 84. Each pair of cooperating divots 84, 86 may form a receptacle into which pins 82 may be inserted. The pins 82 (once inserted) may rotationally fix together the jaw carrier 55 and the input shaft 60. A keeper 80 (in the form of a snap ring, for example) may be mounted on the jaw carrier 60 to axially retain the pins 82 in the receptacles.

The input shaft 60 may have a rear end that extends through the central aperture 22 of the output coupling 20. The rear end of the input shaft 60 may have a radial outward facing surface provided with features that cooperate with corresponding features provided on the radial inward facing surface defining the central aperture 22 so that the input shaft 60 may be rotationally locked to the output coupling 20. Such features are well known in this art. By way of example only, the input shaft 60 may be provided with flats against which flats of the central aperture 22 may abut to rotationally lock together the input shaft 60 and the output coupling 20. The input shaft 60 may include a through bore 62. The through bore 62 may rotatably support a chuck actuating shaft 64.

The chuck actuating shaft 64 may have a rear end with a blind hole 66. The blind hole 66 may receive a PTO actuator shaft 40. The blind hole 66 and the PTO actuator shaft 40 may have corresponding shapes to rotationally fix the chuck actuating shaft 64 to the PTO actuator shaft 40.

The chuck actuating shaft 64 may include a forward end supporting an externally threaded nut 52. The nut 52 may have a shape that tapers in a forward direction. The outer surface of the nut 52 may be provided with radial outward facing threads 68 that may interact with radial inward facing threads 58 of the chuck jaws 2. In this way, the chuck actuating shaft 64 may be screw coupled to the chuck jaws 2. The interaction between the threads 58, 68 may cause the chuck jaws 2 to advance and retract through the passageways 56 of the jaw carrier 55.

The PTO actuator shaft 40 may extend from the blind hole 66 of the chuck actuating shaft 64 and through the central aperture 32 of the PTO drive disk 30 and the central aperture 76 of the disk 74 of the third stage carrier 72. A keeper 41 (in the form of a snap ring, for example) may be mounted on the PTO actuator shaft 40. A spring 44 may be mounted on the PTO actuator shaft 40 and compressed between the third stage carrier 72 and the keeper 41. The PTO actuator shaft 40 may support another keeper (not shown for clarity) via a slot located axially forward of the PTO drive disk 30. As noted above, the PTO actuator shaft 40 may have a shape that corresponds to the shape of the central aperture 32 of the PTO drive disk 30. In this way, the PTO actuator shaft 40 may be rotationally fixed to the PTO drive disk 30.

As shown in FIG. 3, the output coupling 20, the PTO drive disk 30 and the disk 74 of the third stage carrier 72 may be assembled together in a coaxial fashion. Here, the clutch features 36 of the PTO drive disk 30 may face (and engage with) the clutch features 79 of the disk 74. Also, the shift ring 12 (shown in phantom) may be mounted for axial movement so that the radial inward facing splines 13 of the shift ring 12 may selectively engage with the radial outward facing splines 24 of the output coupling 20, the radial outward facing splines 34 of the PTO drive disk 30 and the radial outward facing splines 78 of the disk 74.

B. The Operation

The tool chuck 50 may operate differently depending on the axial position of shift ring 12, which may assume three different operating positions inclusive of a MANUAL OVERRIDE MODE, a DRILL/DRIVE MODE and a CHUCK MODE.

FIG. 3 illustrates the shift ring 12 in the MANUAL OVERRIDE MODE, in which the shift ring 12 may be located at an axial rearward position. Here, the radial outward facing splines 16 of the shift ring 12 may engage with corresponding features provided on the driver housing (not shown). Thus, the shift ring 12 may be rotationally fixed (or grounded) to the driver housing. The radial inward facing splines 13 of the shift ring 12 may engage with the radial outward facing splines 34 of the PTO drive disk 30 and the radial outward facing splines 78 of the disk 74. Thus, the shift ring 12, the PTO drive disk 30 (and therefore the PTO actuator shaft 40) and the disk 74 (and therefore the third stage carrier 72) may be rotationally grounded to the driver housing. In this condition, the output coupling 20 and the input shaft 60 may remain rotatable relative to the driver housing.

A user may grasp and manually rotate the jaw carrier 55 (together with the chuck jaws 2 and the input shaft 60) relative to the driver housing. The chuck actuating shaft 64 may be rotationally fixed to the PTO actuator shaft 40 and therefore may be rotationally grounded to the driver housing. The relative rotation between the chuck jaws 2 and the chuck actuating shaft 64 (and thus the nut 52) may cause the chuck jaws 2 to advance or retract in the passageways 56 (depending on the rotation direction of the input shaft 60) by virtue of the interaction between the radial inward facing threads 58 on the jaws 2 and the radial outward facing threads 68 on the nut 52.

The DRILL/DRIVE MODE may be achieved by sliding the shift ring 12 forward (from its position in the MANUAL OVERRIDE MODE) to an intermediate axial position. Here, the shift ring 12 may be disengaged from (and rotatable relative to) the driver housing. The radial inward facing splines 13 of the shift ring 12 may engage with the radial outward facing splines 24 of the output coupling 20, the radial outward facing splines 34 of the PTO drive disk 30 and the radial outward facing splines 78 of the disk 74. Thus, the shift ring 12, the output coupling 20 (and therefore the input shaft 60), the PTO drive disk 30 and the disk 74 (and therefore the third stage carrier 72) may be rotationally fixed together and rotatable as a unit. Since the PTO drive disk 30 (and therefore the PTO actuator shaft 40 and the chuck actuating shaft 64) and the output coupling 20 (and therefore the input shaft 60, the jaw carrier 55, and the chuck jaws 2) may be rotationally locked together, the tool chuck 50 may not loosen during operation. A user may then power up the driver to rotationally drive the tool chuck 50.

The CHUCK MODE may be achieved by sliding the shift ring 12 (from its position in the DRILL/DRIVE MODE) to a forward axial position. Here, the radial outward facing splines 15 of the shift ring 12 may engage with corresponding features provided on the driver housing. Thus, the shift ring 12 may be rotationally grounded to the driver housing. The radial inward facing splines 13 of the shift ring 12 may engage with the radial outward facing splines 24 of the output coupling 20. Thus, the shift ring 12 and the output coupling 20 (and therefore the input shaft 60, the jaw carrier 55, and the chuck jaws 2) may be rotationally grounded to the driver housing. Here, the PTO drive disk 30 (and therefore the PTO actuator shaft 40 and the chuck actuating shaft 64) and the disk 74 (and therefore the third stage carrier 72) may remain rotatable relative to the driver housing.

A user may then power up the driver to actuate the tool chuck 50. At this time, the third stage carrier 72 may rotationally drive the PTO drive disk 30 via the cooperating clutch features 79, 36 respectively provided on the confronting surfaces of the disk 74 and the PTO drive disk 30. The PTO drive disk 30 may rotationally drive the PTO actuator shaft 40, which in turn may rotationally drive the chuck actuating shaft 64. The chuck actuating shaft 64 (and thus the nut 52) may rotate relative to the chuck jaws 2, which may remain rotationally grounded to the driver housing (via the jaw carrier 55, the input shaft 60, the output coupling 20 and the shift ring 12). This relative rotation may cause the chuck jaws 2 to advance or retract in the passageways (depending on the rotation direction of the chuck actuating shaft 64) by virtue of the interaction between the radial outward facing threads 68 and the radial inward facing threads 58.

During chuck actuation, the input shaft 60, the jaw carrier 55, and the chuck jaws 2 may remain rotationally grounded to the driver housing, while the chuck jaws 2 move through the passageways 56. This may be referred to as a dead spindle feature since the user may not be exposed to (or observe) any rotating parts.

Once the tool chuck 50 is tight (i.e., when the chuck jaws 2 clamp the accessory 99) or fully opened, the cooperating clutch features 79, 36 respectively provided on the confronting surfaces of the disk 74 and the PTO drive disk 30 may give way and slip relative to each other. At this time, the PTO drive disk 30 (together with the PTO actuator shaft 40) may move in an axial forward direction against the influence of the spring 44. When the cooperating clutch features 79 and 36 slip, they may produce an audible indication that the chuck actuation process is complete.

The cooperating clutch features 79, 36 may give way or slip at a predetermined torque threshold. The predetermined torque threshold may be suitably adjusted by selecting an appropriate spring 44 and/or by suitably designing the geometries of the cooperating clutch features 79, 36. Further, the predetermined torque threshold for tightening the tool chuck 50 may be less than the predetermined torque threshold for loosening the tool chuck 50. This feature may be obtained by suitably designing the geometries of the cooperating clutch features 79, 36. Numerous and varied clutch surface geometries are well known in this art, and therefore a detailed discussion of the same is omitted.

C. The Shift Collar/Mode Ring

Figure 5:
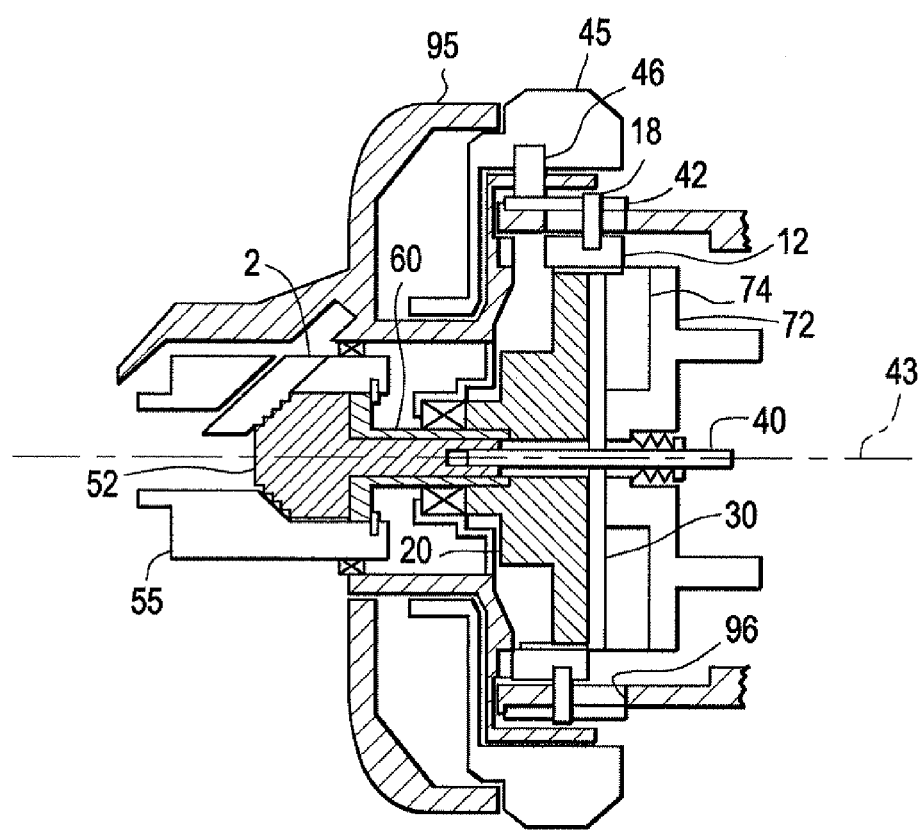
FIG. 5 is a sectional view of a mode ring and a shift collar that may be implemented to change the operational modes of the tool chuck.

FIG. 5 shows an example, non-limiting embodiment of a mode ring 45 and a shift collar 42 that may be implemented to axially position the shift ring 12 depicted in FIGS. 2 and 3 to achieve the various operational modes. In FIG. 5, the portion of the drawing above the axis 43 depicts the DRILL/DRIVE MODE (where the shift ring 12 may be located at the intermediate axial position), and the portion of the drawing below the axis 43 depicts the CHUCK MODE (where the shift ring 12 may be located at the forward axial position).

The mode ring 45 and the shift collar 42 may be mounted for rotation on the driver housing 95. The mode ring 45 and the shift collar 42 may be rotationally fixed together via a radial extension 46. Thus, the mode ring 45 and the shift collar 42 may be rotatable together relative to the driver housing 95.

The shift collar 42 may include a slot that extends in a circumferential direction around the shift collar 42. In this example embodiment, the shift collar 42 may include two circumferential slots. The driver housing 95 may include longitudinal slots 96. The longitudinal slots 96 may extend across (and underneath) the circumferential slots of the shift collar 42. The ends of the wire 18 may extend in a radial outward direction from the shift ring 12, through the longitudinal slots 96 of the driver housing 95 and into the slots of the shift collar 42.

A user may rotate the mode ring 45 (and thus the shift collar 42) relative to the housing 95. At this time, the wire 18 may remain rotationally fixed to the housing 95 via the longitudinal slots 96. During this relative rotation, the ends of the wire 18 may slide through the circumferential slots of the shift collar 42. The shapes of the circumferential slots of the shift collar 42 may influence the wire 18 (and thus the shift ring 12) to the desired axial position. In this regard, the ends of the wire 18 may serve as cam followers and the corresponding circumferential slots may serve as cams. It will be appreciated that the circumferential slots of the shift collar 42 may extend in axial directions to thereby axially displace the shift ring 12.

What is claimed is:

1. A power driver comprising:
   a housing;
   a tool chuck having
      an input shaft mounted on the housing so that the input shaft is rotatable relative to the housing, the input shaft supporting threaded chuck jaws, and
      a chuck actuating shaft mounted for rotation on the input shaft, the chuck actuating shaft being screw coupled to the threaded chuck jaws; and
   a power take off mechanism connected to the tool chuck, the power take off mechanism being adjustable into
      a DRILL DRIVE MODE to rotationally drive the input shaft and the chuck actuating shaft together as a unit, and
      a CHUCK MODE to rotationally drive the chuck actuating shaft relative to the input shaft;
   wherein the power take off mechanism is internal of the housing.

2. The power driver as set forth in claim 1, wherein the power take off mechanism is internal of the housing and the tool chuck.

3. The power driver as set forth in claim 1, wherein the power take off mechanism in the CHUCK MODE rotationally fixes the input shaft to the housing.

4. The power driver as set forth in claim 1, wherein the power take off mechanism is adjustable into a MANUAL OVERRIDE MODE to rotationally fix the chuck actuating shaft to the housing.

5. The power driver as set forth in claim 4, wherein, when the power driver is driven in a reverse direction with the power take off mechanism in the DRILL DRIVE MODE, the power take off mechanism rotationally drives the input shaft and the chuck actuating shaft together as a unit regardless of the application torque.

6. The power driver as set forth in claim 1, wherein the chuck actuating shaft is rotatable relative to the threaded chuck jaws.

7. A power driver comprising:
   a housing;
   a tool chuck having
      an input shaft mounted on the housing so that the input shaft is rotatable relative to the housing, the input shaft supporting threaded chuck jaws,
      a chuck actuating shaft mounted for rotation on the input shaft, the chuck actuating shaft being screw coupled to the threaded chuck jaws; and
   power take off means for adjusting into
      a DRILL DRIVE MODE to rotationally drive the input shaft and the chuck actuating shaft together as a unit, and
      a CHUCK MODE to rotationally drive the chuck actuating shaft relative to the input shaft;
   wherein the power take off means is internal of the housing.

8. The power driver as set forth in claim 7, wherein the power take off means in the CHUCK MODE rotationally fixes the input shaft to the housing.

9. The power driver as set forth in claim 7, wherein the power take off means is for adjusting into a MANUAL OVERRIDE MODE to rotationally fix the chuck actuating shaft to the housing.

10. The power driver as set forth in claim 7, wherein the chuck actuating shaft is rotatable relative to the threaded chuck jaws.

11. A power driver comprising:
    a tool chuck having
       an input shaft supporting threaded chuck jaws, and
       a chuck actuating shaft mounted for rotation on the input shaft; and
    a power take off mechanism having
       a power take off actuator shaft rotationally fixed to the chuck actuating shaft,
       an output coupling rotationally fixed to the input shaft,
       a power take off drive disk rotationally fixed to the power take off actuator shaft,
       a disk confronting the power take off drive disk, and
       a shift ring mounted for movement to selectively engage with and rotationally lock to the output coupling, the power take off drive disk and the disk.

12. The power driver as set forth in claim 11, wherein the shift ring is moveable to an axial forward position to engage with the output coupling.

13. The power driver as set forth in claim 12, further comprising a housing rotatably supporting the tool chuck;
    wherein the shift ring in the axial forward position is rotationally fixed to the housing.

14. The power driver as set forth in claim 11, wherein the shift ring is moveable to an axial intermediate position to engage with the output coupling, the power take off drive disk and the disk.

15. The power driver as set forth in claim 14, further comprising a housing rotatably supporting the tool chuck;
    wherein the shift ring in the axial intermediate position is rotatable relative to the housing.

16. The power driver as set forth in claim 11, wherein the shift ring is moveable to an axial rearward position to engage with the power take off drive disk and the shift ring.

17. The power driver as set forth in claim 16, further comprising a housing rotatably supporting the tool chuck;
    wherein the shift ring in the axial rearward position is rotationally fixed to the housing.

18. The power driver as set forth in claim 11, wherein the chuck actuating shaft is rotatable relative to the treaded chuck jaws.

* * * * *